(No Model.)
C. DEIS.
EGG AND SUGAR BEATER.
No. 297,115. Patented Apr. 22, 1884.
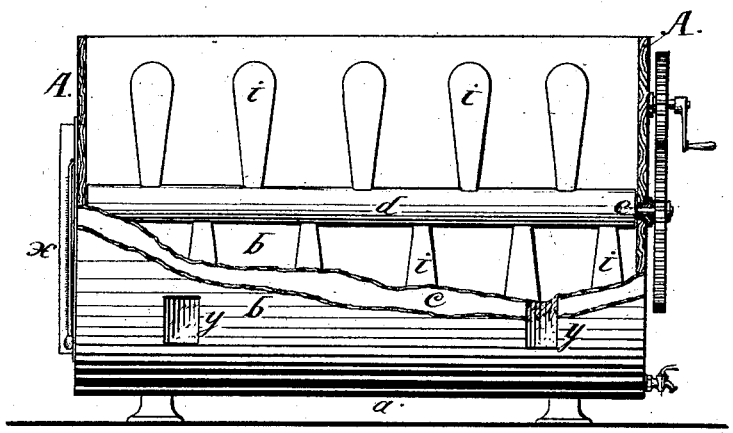
WITNESSES,
J. B. Fraser
H. Williams
Charles Deis, INVENTOR,
By Geo. Tracy & Co.,
ATTORNEYS.

UNITED STATES PATENT OFFICE.

CHARLES DEIS, OF BUFFALO, NEW YORK.

EGG AND SUGAR BEATER.

SPECIFICATION forming part of Letters Patent No. 297,115, dated April 22, 1884.

Application filed September 24, 1883. (No model.)

*To all whom it may concern:*

Be it known that I, CHARLES DEIS, residing at Buffalo, in the county of Erie and State of New York, have invented a new and Improved Egg and Sugar Beater; and I hereby declare that the following is a full, clear, and exact description of the same, reference being made to the accompanying diagram and letters of reference marked thereon.

The invention consists of a box or receptacle covered, if desired, with rounded bottom, a jacket or hollow space on the outside for holding water or other liquid at such temperature as will produce the desired effect upon the contents of the box, and a shaft with projections of suitable form to best agitate, stir, or beat up the contents of the box, said shaft being so situated and supported horizontally in the box as by power suitably applied at one end to be rotated at proper speed and cause the projections to circle around it and thoroughly agitate, beat, and mix the contents of the box within the radius from the shaft to the bottom of the box.

The invention is intended for use in bakeries where large quantities of eggs, sugar, and flour are beaten for cake-making, &c., the object being to supply a cheap and simple machine that will do the work in a much shorter time than by hand-beating as generally practiced.

In the drawing, the figure is a side elevation, having wooden (solid) ends A' A' and a rounded bottom, $a$, to the whole. The sides and bottom are composed of two walls, (preferably of tin,) $b\ b$, leaving an open space, $c$, between, into which is poured water or other liquid of a temperature to affect that of the contents of the box, as desired. The outer wall, $b$, is in the nature of a jacket to the sides.

The beater consists of a shaft, $d$, one end running in a bearing in the end of the box, the other or operating end projecting through the other end A' of the box, or provided with a journal, $e$, that sets into said shaft $d$ and is removed therefrom, for the purpose of taking out the beater or churn-dasher to dip or pour out the contents of the box, the rounded bottom greatly aiding this object by not presenting any corners or sharp angles into which the stuff could stick, and allowing it to be easily cleaned out. On the shaft are set a number of projecting whips or beaters, $i\ i\ i\ i$, which may be of wire or any suitable material set in rows alternately at right angles or at acute angles to the shaft, or in any other form that when the shaft is rapidly revolved by power applied by suitable mechanism at $e$ will beat up the mass of eggs or eggs and sugar and flour in a very short time to the required lightness and consistency, giving the same effect as rapid hand-beating.

The end walls, A' A', may also be double, either or both, if desired; but I prefer only the side walls and bottom double, and the inner one particularly made of tin, through which heat easily passes.

A cover may be used, made into a heater, if desired. Small glass windows $y$ may be used, set into the sides or top of the box to see the state of the contents while being operated. A thermometer, $x$, may be inserted into either end of the box or hung simply against one of the windows on the inside, to show the temperature of the contents of the box from the outside. A plug will stop an opening in the bottom or side to let out the hot water, and an opening at the top of the sides will be used to pour in the same.

The machine may be made of small or large size, and be equally available for domestic or general use.

I claim as my invention—

The combination of the horizontal shaft $d$, having projections or whippers $i\ i\ i$, with the box or receptacle A' A' A', having the rounded bottom $a$, with jacket or apartment $b\ b$, all constructed substantially as and for the purposes described.

This specification witnessed and signed this 29th day of August, 1883.

CHARLES DEIS.

Witnesses:
GEORGE M. BROWNE,
S. B. PORTER.